United States Patent
Polk (10) Patent No.: US 7,147,397 B2
(45) Date of Patent: Dec. 12, 2006

(54) SYSTEM FOR STORING AND DISPLAYING AUDIO/VIDEO WORKS

(76) Inventor: Jonathan M Polk, 135 Alpine Rd., West Palm Beach, FL (US) 33405

( * ) Notice: Subject to any disclaimer, the term of this patent is extended or adjusted under 35 U.S.C. 154(b) by 0 days.

(21) Appl. No.: 10/768,510

(22) Filed: Jan. 30, 2004

(65) Prior Publication Data

US 2004/0182724 A1    Sep. 23, 2004

(51) Int. Cl.
*B42F 13/00* (2006.01)
(52) U.S. Cl. ............ 402/79; 281/38; 281/31; 206/308.3
(58) Field of Classification Search ........ 402/79; 281/38, 31, 15.1, 21.1; 206/308.3, 472
See application file for complete search history.

(56) References Cited

U.S. PATENT DOCUMENTS 5,772,020 A * 6/1998 Hara .................. 206/308.3

* cited by examiner

*Primary Examiner*—Willmon Fridie, Jr.
(74) *Attorney, Agent, or Firm*—Henry Brendzel (57) ABSTRACT

A storage system for holding entertainment-content storage devices such as CDs comprises one or more pages that are combined to form a book of pages, where each of the pages is adapted to store a plurality of such storage device, as well as associated descriptive matter media, such as pictures booklets, etc. More particularly, at least one side of each page includes a plurality of distinct places for inserting and, thereby storing, the storage devices, and physically proximate means for storing descriptive matter media. In one embodiment, for example, the places for inserting and storing storage devices in each page comprises four generally circular cavities having their centers lying on a circle that is centered on a page, and a covering that partially covers the circular cavities. Each circular cavity is dimensioned to hold a CD (or DVD) and the partial covering of the circular cavity is adapted to insure that a CD will rest securely in the circular cavity. The covering is adapted to also hold collectible keepsake items, such as a concert ticket, or a lyrics booklet.

16 Claims, 6 Drawing Sheets

FIG. 3
(EXPLODED VIEW)

FIG. 4
(EXPLODED VIEW)

FIG. 7
(EXPLODED VIEW)

FIG. 8

FIG. 9
(EXPLODED VIEW)

SYSTEM FOR STORING AND DISPLAYING AUDIO/VIDEO WORKS

BACKGROUND OF THE INVENTION

1. Technical Field

This invention relates to storage systems that facilitate both display and storage of devices such as Compact Discs, DVDs, CD-ROMS, etc., as well as accompanying descriptive matter media.

2. Background Art

The recording industry historically produced works of entertainment, such as music recordings, on vinyl records. Starting with two songs to a record (one on each side), the industry moved to long-playing (LP) albums that held many songs of the same artist, or group. Because of their size, these albums allowed the manufacturer to include a variety of descriptive matter on and in the packaging of such recordings. This included photographs, artwork, printed copies of lyrics, editorial material known as "liner notes," package inserts, and other items (henceforth, "descriptive matter" or "descriptive matter media", as appropriate). To many purchasers, these photographs, artwork and/or other materials added substantially to the enjoyment and appreciation of the musical recordings, and made the "package" that consumers purchased a multi-dimensional product that engaged their imaginations on multiple levels. In addition, the large size of the packaging, photographs and artwork made each individual LP album a collectible "keepsake" item that consumers could display in their homes (often by standing up face forward, individually or as group, leaning against a wall, furniture, or a stereo system). In such manner, the album package served as a demonstration and reflection of the music collector's identification as a fan of the particular recording artist or recording.

Recent improvements in technology have resulted in the development of large capacity storage media that are much smaller; for example, compact discs, which measure only 4.5 inches (approximately)—as compared to 12 inches (approximately) for an LP record. Unfortunately, the small size, offering approximately 14% of the area that an LP offers, makes the inclusion or display of associated photographs, artwork, and other materials problematic. The currently most common means for storing CDs that are sold in stores is a plastic box—commonly referred to as a jewel box—that encases a single, or very few, CDs (or DVDs). These boxes are substantially the same size as the CDs and, consequently, they do not lend themselves easily to the inclusion of significant amounts of descriptive matter generally, and descriptive matter media in particular. Moreover, the compact size of the jewel box makes the storage and organization of larger collections of CDs awkward and unsatisfying to the collector. Further, it is difficult to maintain the storage order of many small sized containers. Still further, the jewel box itself is a clumsy container that makes repeatedly accessing the CD frustrating, and there is relatively little display value to these diminutive packages.

At times, one can find particular collections of CD recordings that are released in so-called "box sets," which often employ collector keepsake packaging in a larger format than that used for individual CD recordings; such box sets, however, serve only to store those specific CDs which are sold in the set (which CDs are generally new compilations of existing recordings, as opposed to the actual albums which the fan previously owned and cherished as a vinyl LP) and therefore offer no storage for the other CDs in any fan's collection, or in particular, for the CDs which the fan most cherishes. More recently, box sets are being issued in reduced, jewel box sized packages, to accommodate the racking systems of record retail stores, thereby minimizing or losing entirely the positive artwork packaging elements of the box set.

One alternative means developed for storing CDs are various systems of individual plastic "sleeves" or "envelopes" which the consumer can substitute for the jewel boxes. These sleeves or envelopes, however, although less awkward and clumsy than the jewel box, do not lend themselves to being or remaining easily organized, and maintain the same size disadvantages of the jewel box.

Another alternative are storage folders which have been developed to store CDs and their accompanying artwork books (i.e., what is commonly called the "CD booklet") without the jewel box, in an attempt to offer a uniform method for storing entire CD collections in a less awkward, more accessible and organized, fashion. These folders typically have pages that essentially consist of four clear or partially opaque envelopes that hold CDs with their booklets in the same envelope. Although these folders allow CD collections to be stored in a more uniform and more organized way than systems for storing individual CDs in separate boxes or envelopes, they do not permit the CDs or DVDs to be displayed or appreciated as a collection. While they provide a means for storing numerous CDs in a relatively compact space, they generally only permit the CDs to be stored in generic folder cases, which further negate any collector keepsake elements of the collections. Moreover, because these folders store CDs in generic folders they do not lend themselves to easy organization; and because the envelopes are designed to either hold both the CD and the CD booklet together, or to file them separately and lose up to half of the advantage of compact storage, they are not as easily accessed or organized as they would seem.

SUMMARY OF THE INVENTION

The foregoing disadvantages of prior art storage systems are overcome, and an advance in the art is achieved, with a system that comprises one or more pages that are combined to form a book of pages, where each of the pages is adapted to store and display a plurality of information storage devices, such as CDs, DVDs, etc. (henceforth, "storage devices"), as well as associated descriptive matter media. More particularly, at least one side of each page includes a plurality of distinct places for inserting and, thereby storing, the storage devices, and physically proximate means for storing descriptive matter media.

In one embodiment, for example, the places for inserting and storing storage devices in each page comprises four generally circular cavities having their centers lying on a circle that is centered on a page, and a covering that partially covers the circular cavities. Each circular cavity is dimensioned to hold a CD (or DVD) and the partial covering of the circular cavity is adapted to insure that a CD will rest securely in the circular cavity. The covering is adapted to also hold the CD booklet in a separate space than the CD so as not to interfere with access to the CD, and allowing for the utilization of the cover of the CD booklets for display and as organizational marking points, without substantially compromising storage capacity.

In another embodiment, the places for inserting and thereby storing storage devices such as CDs are pockets that are constructed into each page, and the places for storing the descriptive matter media are physically proximate secondary pockets.

To promote effective organization, an embodiment of this invention includes descriptive matter on at least some of the pages, such as labels and/or pictures, that guide a user as to which CDs should be stored in which places.

To enhance effective utilization of the pages, still another embodiment includes places for inserting and thereby storing CDs and associated descriptive matter on both sides of the pages.

In yet another embodiment, the book includes means to add or remove pages.

DETAILED DESCRIPTION

This invention provides a collectible keepsake book-like storage system for storing discrete collections of CDs, DVDs, or other entertainment-content storage devices and associated descriptive media. This system may be pre-customized, for example, for storing the CD-based media relating to a specific artist or subject, it can be customized by the user of the system, or it can form a general storage system. The book-like storage system typically comprises a plurality of pages having a novel construction that includes specific locations for inserting the entertainment content storage devices and for inserting associated descriptive media. In its customized embodiment, at least some of the locations for holding the storage devices include an identifier to assist the user in the organizing of the user's storage device, such as CD, and associated descriptive matter media, such as booklets, pictures, listing of song titles, lyrics, etc. The identifier may be a label, a picture, etc.

Figure 1:
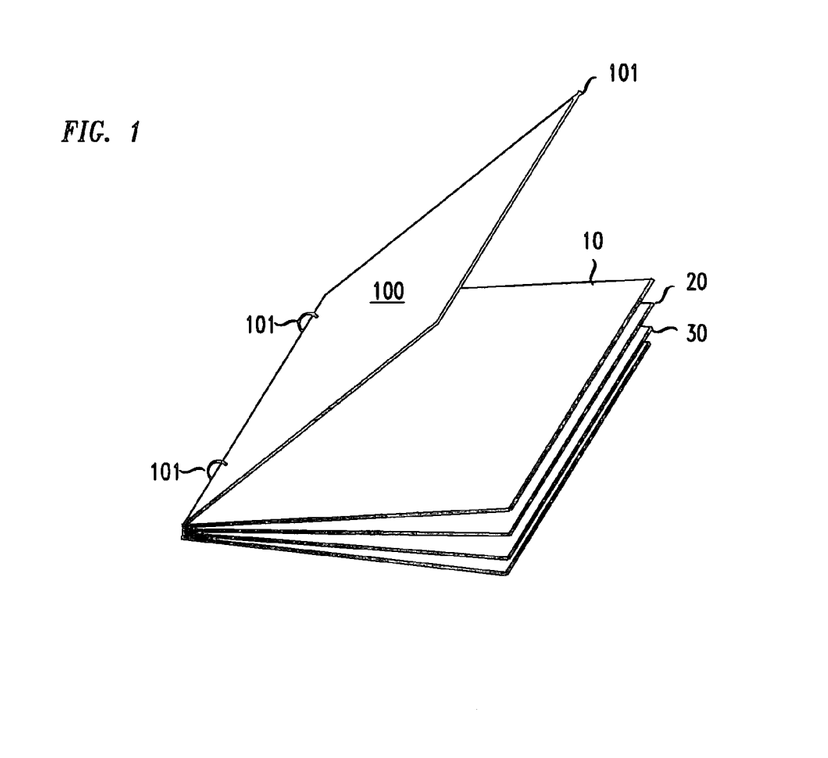
FIG. 1 shows the general construction of a storage system in accord with the principles disclosed herein.

FIG. 1 shows a perspective view of a storage system 100, accord with the principles disclosed herein, that is binder-like. It includes a cover page 101, internal pages 10, 20 and 30, and rings 101 that hold the pages between top cover page 101 and a bottom cover page (not labeled). Rings 101, which may be conventional note-book binder rings, allow the user of system 100 to add or delete pages from system 100. Of course, system 100 can be constructed to be book-like, in the sense that it has a fixed number of pages that are attached to a spine between the outer covers of the book, obviating the need for rings 101 or any other means for adding or deleting pages from the storage system.

Figure 2:
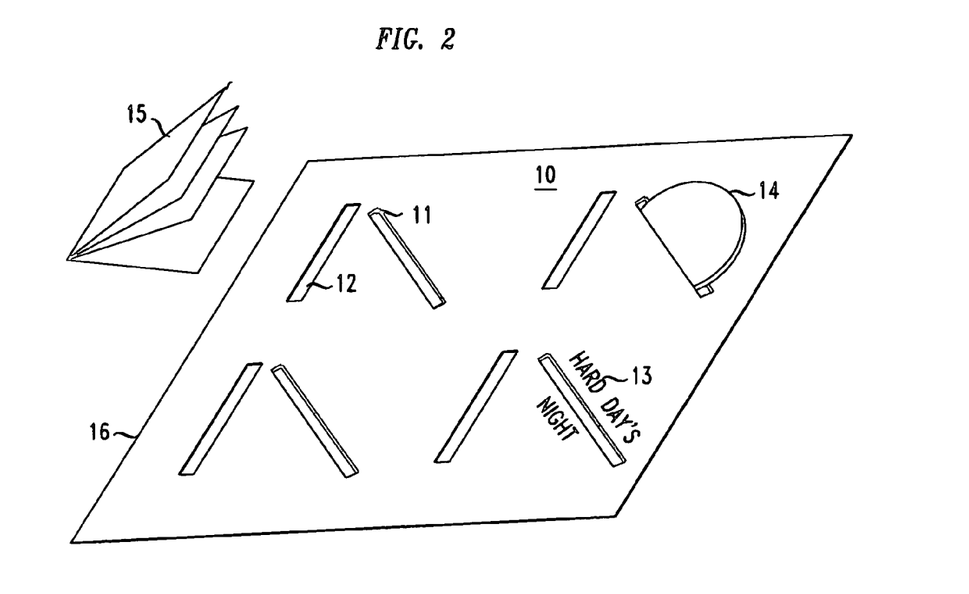
FIG. 2 depicts one embodiment for a page in the FIG. 1 system.

FIG. 2 presents the top view of an illustrative page within system 100. As illustrated, page 10 comprises four diagonal slits for inserting CDs or DVDs. These slits are arranged on a diagonal to allow for easy handling of CDs during insertion or retrieval of the CDs but, of course, the precise angle of the slits is not critical. When edge 16 is the edge that is attached to the spine of system 100, I found it advantageous for the angle of the slit to be between 90 degrees and 180 degrees, with the reference 0 degrees extending to the right from edge 16 (as depicted in FIG. 2, the angle is approximately 135 degrees).

In physical proximity to each CD-holding slit 11, page 10 includes slits 12 that are designed to allow the user to insert one or more descriptive media. This may include a CD booklet, a photograph, a concert ticket, etc. In the case of booklet 15, for example, the user of system 100 might insert all but the first page of booklet 15 into slit 12.

Finally, for embodiments where page 10 is pre-customized to a particular collection of CDs, for example, songs of "The Beatles," one or more of the areas that are proximate to a diagonal slit and a vertical slit (as depicted in FIG. 2) includes an indicator, or identifier, such as label 13, to assist the user of system 100 to insert the proper CD into the associated CD-holding slit 11. Of course, the identifier can be much more elaborate than the one depicted in FIG. 2, such as a replica of the artwork that is found on a purchased CD, or depicted on the jewel case of the purchased CD.

When slits 11 of page 10 are made slightly shorter than the diameter of CDs 14, and page 14 is page of a somewhat rigid material (such as cardboard, or plastic), there is no need to include retaining means for CDs 14. In normal handling of system 100, frictional forces tend to keep CDs 14 lodged within slits 11. However, if slits 11 and 12 extend all the way through page 10, then the backside of page 10 would show those portions of CDs 14 and descriptive matter items (such as booklet 15) that were inserted into the corresponding slit. This is not terribly attractive, so I found it advantageous to construct an arrangement whereby the slits extend only partially into page 10, and page 10 includes spaces within the page that are coupled to the slits, and accommodate the portions of CDs 14 and descriptive media (e.g. booklets 15) that are inserted into slits 11 and 12, respectively.

Figure 3:
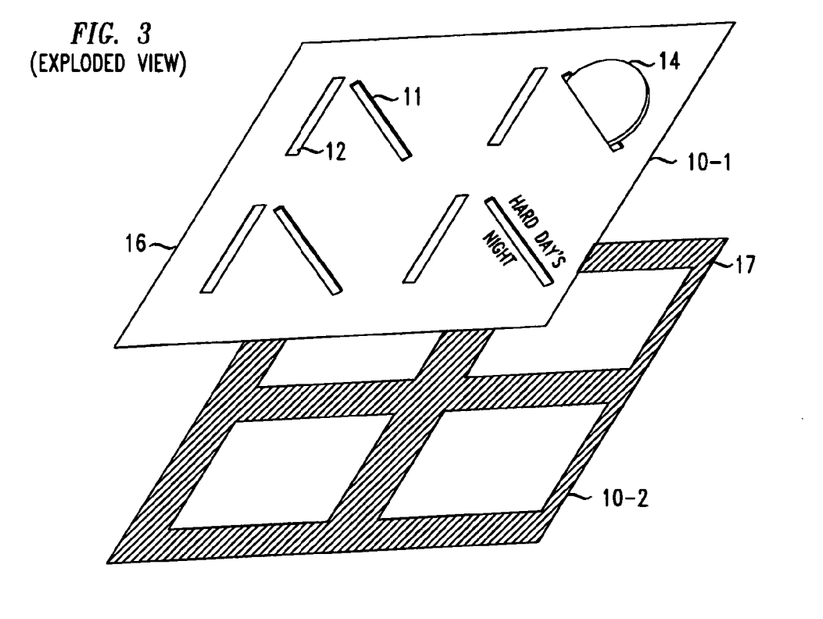
FIGS. 3 and 4 are exploded views of two different constructions of the FIG. 2 page.

The construction of page 10 so that slits 11 and 12 extend only partially into the page and are the ingress and egress venues for the holding spaces within page 10 can take numerous forms. When constructed from plastic material, a mold can be employed that creates page 10 so as to include slits 11 and 12, and the associated enclosed spaces within the page. Alternatively (and particularly when constructed from sheets (e.g., paper, cardboard, plastic, etc.), page 10 can be constructed by joining a number of plies. Illustratively as shown in FIG. 3, page 10 comprises a first ply (10-1) that include slits 11 and 12, and a second ply (10-2) that is solid. The solid ply is attached to the first ply (e.g., glued, sewn, molded into) at least around the perimeter of the page and, preferably, also in the region between the sets of slits. This is illustrated in FIG. 3, where the two plies are glued to each other along crosshatched area 17 that covers the perimeter of page 10 and two stripes that cross each other at the center of the page.

Figure 4:
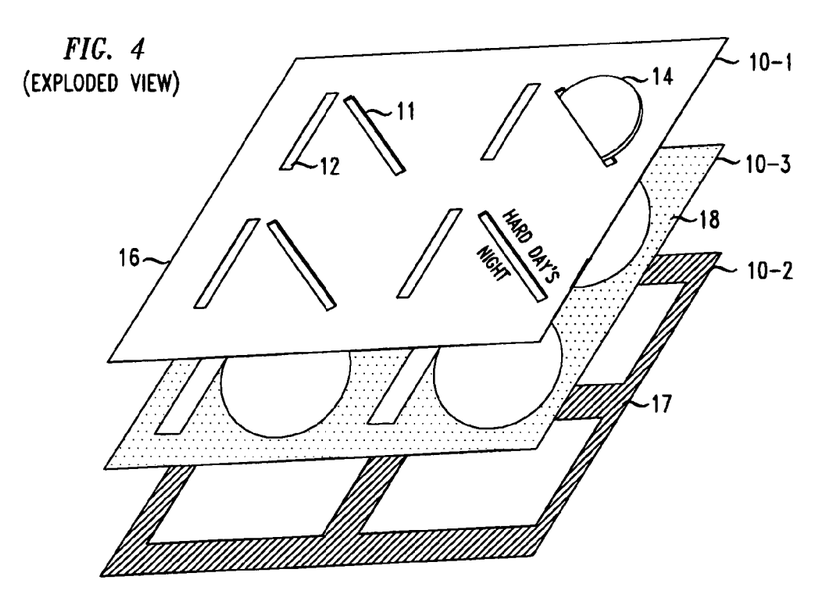

It may be realized that the arrangement of slits 11 and 12, even with addition of the second ply, can present a bit of a problem when both a CD and an associated booklet are stored, because some portion of CD 14 that is on the inside of slit 11 can interfere with some portion of the back page of booklet 15 that is on the inside of slit 12. To avoid this possible interference, page 10 can include partially, or completely, separable spaces that are associated with slits 11 and slits 12. One embodiment that provides for such separate spaces, shown in FIG. 4, includes a third ply (10-3) that is interposed between plies 10-1 and 10-2 and glued to the ply 10-1 throughout an area, such as the stippled area 18. Note that in an area below slits 12, ply 10-3 is not glued to ply 10-1, to allow the descriptive matter media that is inserted in to slits 12 to be held within a cavity that is formed between plies 10-3 and 10-2.

Figure 5:
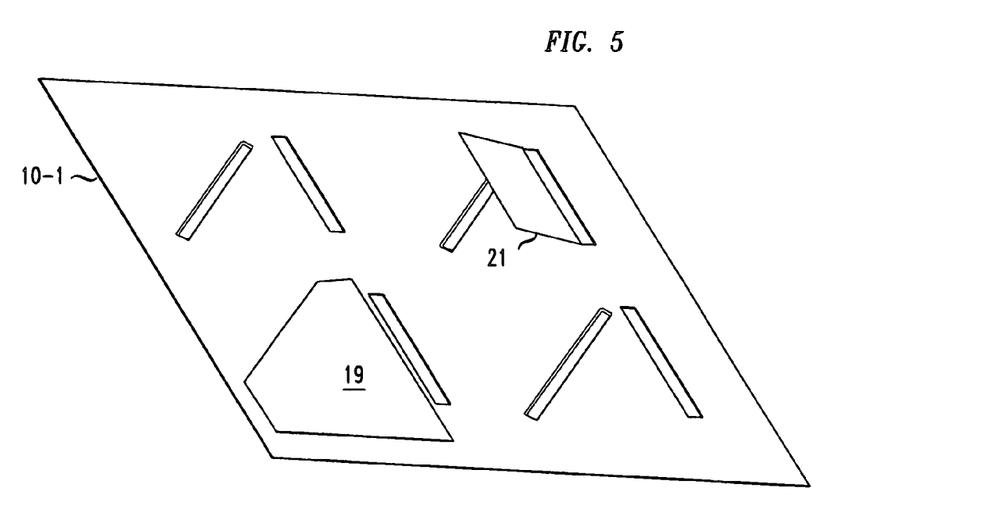
FIGS. 5 and 6 show two different arrangements for pockets that hold storage device and, concurrently, provide separation between the storage devices and spaces for descriptive matter media.

FIG. 5 depicts two additional, alternative, arrangements that prevent interference between that which is inserted in slits 11 and that which is inserted into slits 12. Element 19 in FIG. 5 is a piece of paper (or any other sheet material) that is glued at its periphery to the underside of ply 10-1 of sheet 10. The gluing of element 19 around its periphery creates a pocket that is accessible through the slit (11) in the top side of ply 10-1. Alternatively, a flap 21 may be included in the underside of ply 10-1 that extends from each slit 12 toward the associated slit 11. Flap 21 guides both the CD that is inserted into slot 11, as well as booklet 15 that is inserted into slit 12, in such a manner that the CD is on one side of the flap, and the booklet is on the other side of the flap. Consequently, the booklet and the CD do not interfere with one another.

The above description relates to the storing of CDs on one side of page 10. In situations where it is desirable to have fewer pages in the FIG. 1 system, it is advantageous to store CDs and associated descriptive media on both sides of each page. This is achieved easily by constructing each page with a center layer, and additional layer sets on each side of the center layer. Each layer set provides for the storage of CDs and associated descriptive matter media, as described above. Illustratively, a page may comprise a center layer 10-2, with each layer set comprising an outside layer 10-1 and an interposed layer 10-3.

Figure 6:
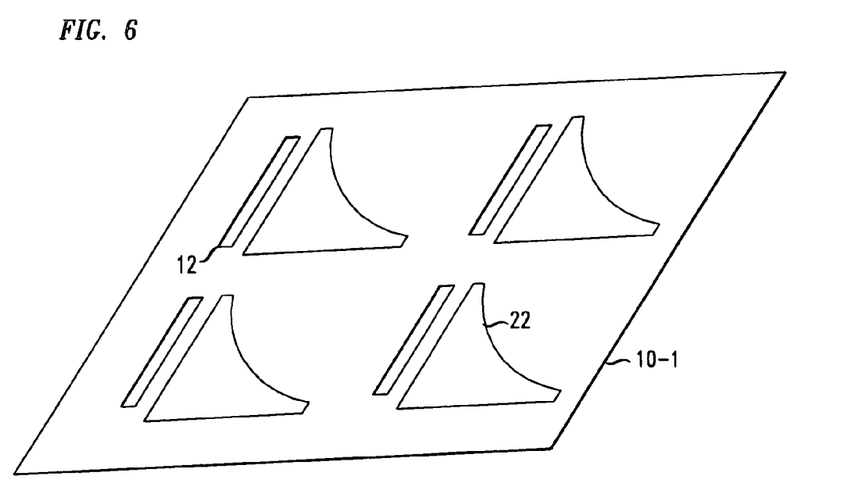

FIG. 6 presents yet another alternative embodiment. Instead of including slits 11 in page 10, with an attendant space, or pocket, within page 10, the FIG. 6 embodiment includes generally triangular pieces (paper, plastic, etc.) that are attached (for example, glued) to the outer layer(s) of page 10 along the two mutually orthogonal sides of the triangular pieces. This results in triangular-shaped pockets into which CDs can be inserted (although the shape of the pocket can be rounded, or any other shape that will hold a disc in place).

Figure 7:
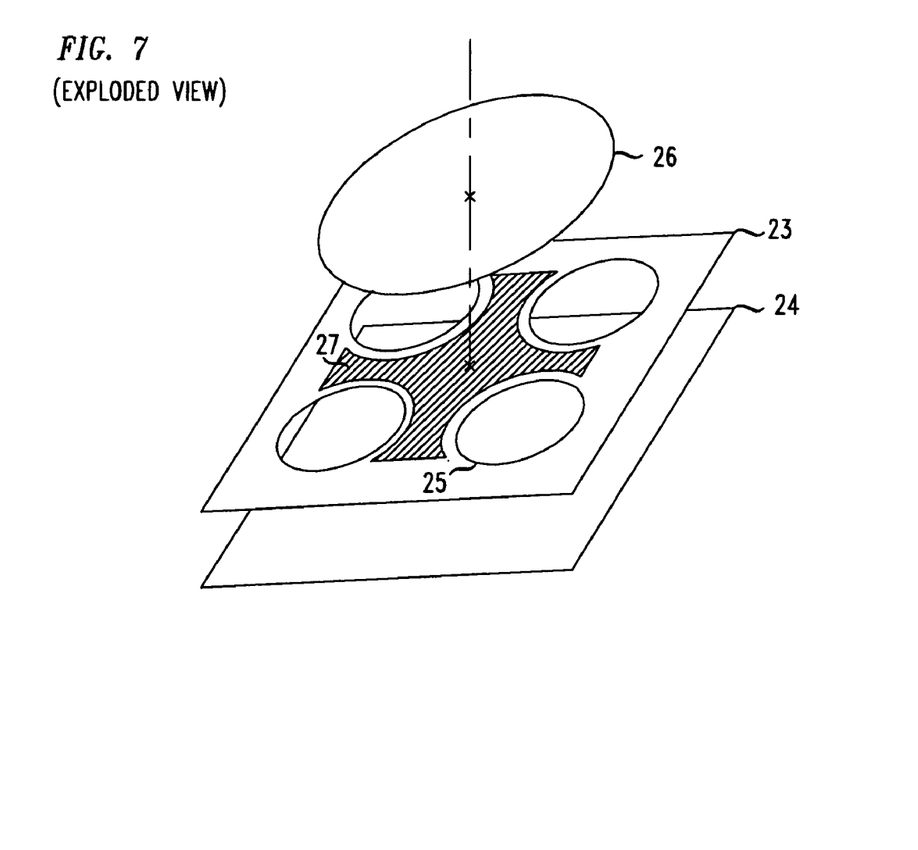
FIGS. 7 and 8 illustrate another embodiment, in exploded view and unexploded view, respectively, of a page in the FIG. 1 system.

FIG. 7 presents another embodiment (in exploded view) for pages in the FIG. 1 storage system. In connection with the placement of CDs and DVDs, each page includes four cylindrical cavities that are created by joining ply 23 that contains four holes 25 with ply 24. The four holes have their centers on a circle that is centered on the page, or slightly offset away from the edge of the page that attached to the spine of FIG. 1 storage system. As depicted, the centers are equally spaced around such a circle (which means that lines that join alternate circle centers form two mutually orthogonal lines). In embodiments where CDs are stored on both sides of a page, ply 24 represents the center ply, and the page contains an outer ply 23 on each side. The thickness of ply 23 is chosen to approximately equal the thickness of CDs.

To hold the CDs that may be placed within the resulting cylindrical cavities defined by circles 25, the FIG. 7 embodiment includes a disc 26 that is approximately centered about the set of four cylindrical cavities, and attached to ply 23, illustratively, throughout hatched area 27. What results is a set of four quarter-circle sectors of disc 26 that partially cover the cylindrical cavities. The partial cover of the cavities provides a mechanism that allows insertion and extraction of CDs from the cylindrical cavities, while at the same time prevents the CDs from falling out of the cylindrical cavities of their own volition. For embodiments where it is desirable to see whatever is written or otherwise shown on the CDs, disc 26 is advantageously made of a transparent plastic. Whatever material is used, it needs to be rigid enough to hold the CDs, yet pliable enough to allow a person to easily extract a CD from the cylindrical cavity.

Figure 8:
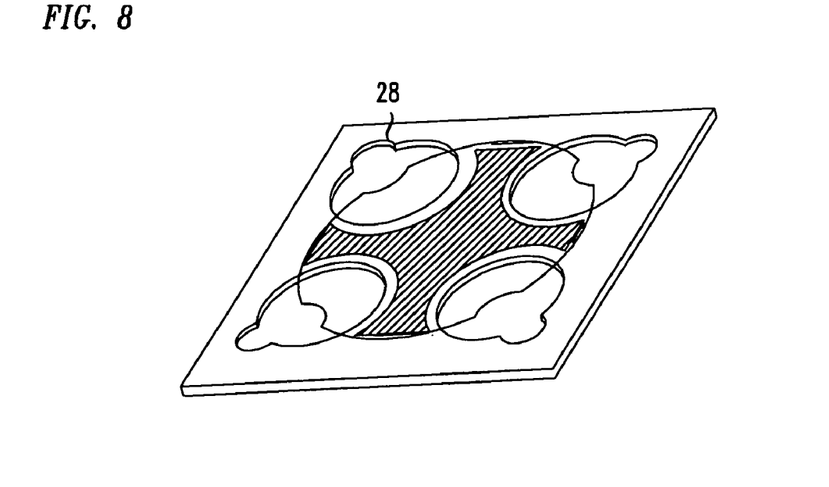

FIG. 8 shows the FIG. 7 arrangement not in exploded view, and also it depicts a variation thereof. Specifically, the FIG. 8 arrangement includes circular indentations 28 in each of the cylindrical cavities. Indentations 28 facilitate reaching the edge of a CD so that it can be removed from the cylindrical cavity more easily.

Figure 9:
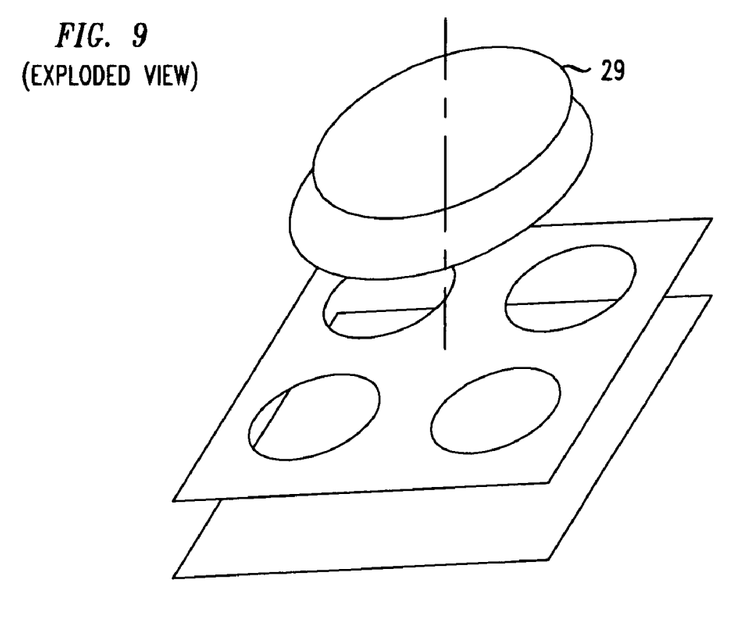
FIGS. 9 and 10 show an augmented embodiment, also in exploded view and unexploded view, respectively, of the FIG. 7 embodiment.
Figure 10:
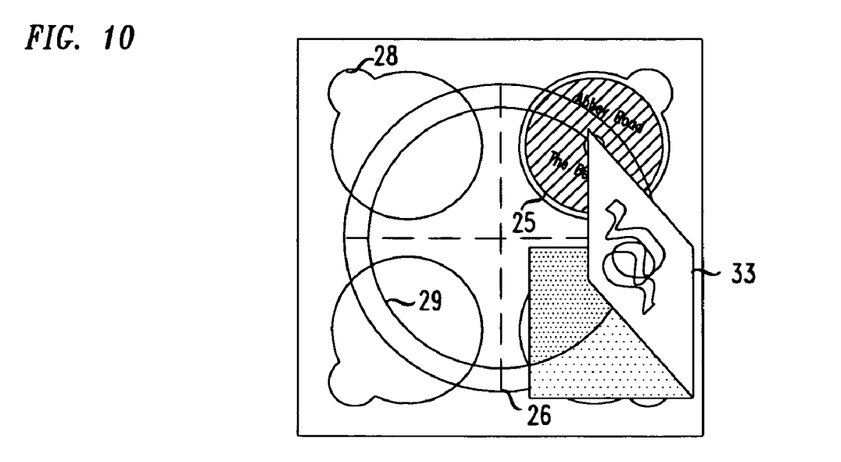

Descriptive materials, such as concert tickets, or a CD booklet can be inserted inside the flaps created by the disc sectors (over the CDs) but that creates a slight interference situation, in that it may be somewhat awkward to remove a CD from its cylindrical cavity without removing the descriptive material. FIG. 9 presents a modified embodiment that overcomes this difficulty. It includes, a disc 29 that, illustratively, is smaller in diameter than the diameter of disc 26 and co-centered therewith. Disc 29 is attached to disc 26 along a cross-like region not unlike region 27, forming sector flaps that can hold descriptive material. Disc 29 may be constructed from a transparent plastic material like that of disc 26, and the two discs can be molded to each other. Alternatively, discs 29 and 26 can be attached to ply 23 through a sewing operation, heat-sealing, or other operation with the same effect. FIG. 10 shows the unexploded view of the FIG. 9 arrangement, with a sewn attachment of discs 29 and 26 to ply 23, and with a CD 25 and a CD booklet 33 shown inserted.

Figure 11:
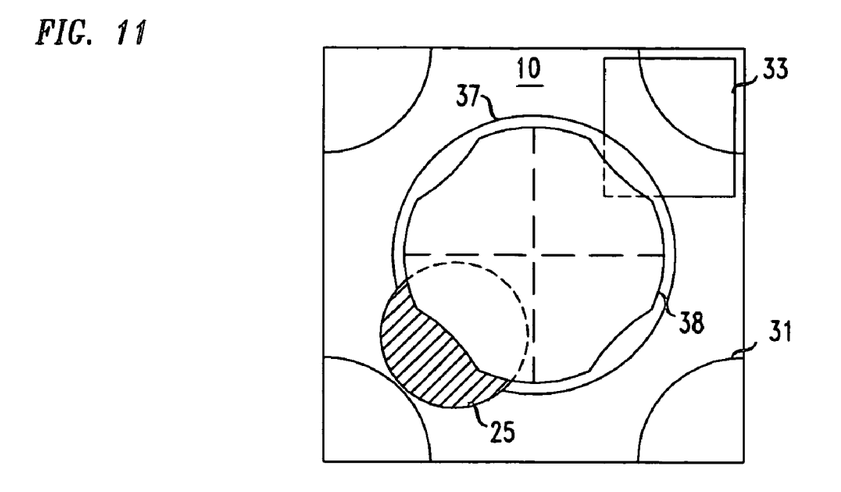
FIG. 11 presents still another embodiment of a page in the FIG. 1 system that can store CDs or, alternatively, an LP record.

FIG. 11 presents yet another embodiment for pages of the FIG. 1 system. It includes quarter-circle sectors 31 that are attached to the four corners of page 10 for storing the descriptive materials (such as booklet 33). In the center of the page, there are two discs 37 and 38 (for example, plastic) that are sewn together and to the page in a cross pattern (as depicted by the dashed lines) to form four pouches. Each pouch is associated with a corner, and is capable of storing a CD, such as CD 25.

Figure 12:
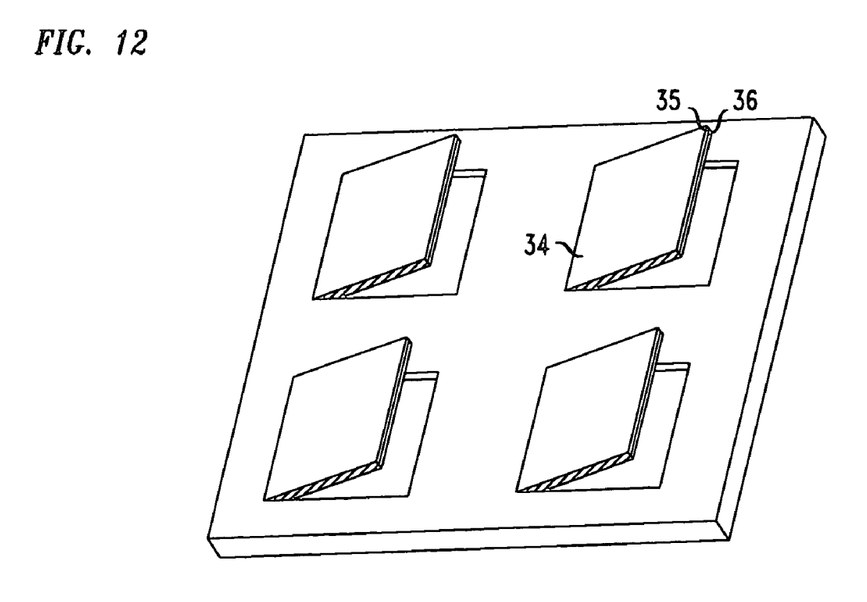
FIG. 12 presents yet another embodiment of a page in the FIG. 1 system.

FIG. 12 presents still another embodiment for pages of the FIG. 1 system. It includes four hinged sleeves 34 that pivot about a line that is different from a line about which the entire page pivots, with openings 35 at the edge away from the hinged side, through which CDs can be placed within the sleeves. Descriptive matter can be inserted in the cavities of the page, below the hinged sleeves, and labeling information that assists in organizing the storage of devices in the system can be placed on the outside face of the sleeves, as well as around the sleeves.

The above descriptions disclose various embodiments of the storage system disclosed herein. It should be understood that various modifications to the disclosed embodiments can be created by a skilled artisan without departing from the spirit and scope of the invention defined in the following claims.

The invention claimed is:

1. A storage system including, inter alia, one or more pages, where each page of the pages comprises:
   a first layer;
   a second layer, substantially superimposed on, and attached to, said first layer, that includes a plurality of storage-device-holding elements; and
   a holder arrangement, constructed to be an integral part of said second layer or attached to said second layer along more than one direction, that creates descriptive-matter-media-holding spaces, where each of said storage-device-holding elements is a generally circular cutout in said second layer, with an additional cutout that joins the circular cutout.

2. The storage system of claim 1 where said additional cutout form a part of a second, generally circular, cutout.

3. A storage system including one or more pages, where each page of the pages comprises:
   a first layer;
   a second layer, substantially superimposed on, and attached to, said first layer, that includes N storage-device-holding elements of substantially identical in shape and size, N being an integer greater than one; and
   a holder arrangement, constructed to be an integral part of said second layer or attached to said second layer along more than one direction, that creates N descriptive-matter-media-holding spaces of a selected shave and size that are spatially situated to have a readily apparent 1 to 1 correspondence with said N storage-device-holding elements;
   where said holder arrangement includes a third layer that is affixed to said page over said storage-device-holding spaces to create a plurality of pockets, each of said pockets being in spatial association with one of said storage-device-holding spaces.

4. A storage system including, inter cilia, one or more pages, where each page of the pages comprises:
   a first layer;
   a second layer, substantially superimposed on, and attached to, said first layer, that includes a plurality of storage-device-holding elements; and
   a holder arrangement, constructed to be an integral part of said second layer or attached to said second layer along more than one direction, that creates descriptive-matter-media-holding spaces, where said holder arrangement includes a third layer that is affixed to said page over said storage-device-holding spaces to create a plurality of pockets, each of said pockets being in spatial association with one of said storage-device-holding spaces, and wherein each of said pages is in the shape of a rectangle, or a square, and said third layer is circular.

5. The storage system of claim 4 where said third layer is affixed to said second layer along four pair-wise substantially orthogonal directions emanating from a center region of said page.

6. A storage system including, inter alia, one or more pages, where each page of the pages comprises:
   a first layer;
   a second layer, substantially superimposed on, and attached to, said first layer, that includes a plurality of storage-device-holding elements; and
   a holder arrangement, constructed to be an integral part of said second layer or attached to said second layer along more than one direction, that creates descriptive-matter-media-holding spaces, wherein said holder arrangement comprises:
      a third layer, attached to said second layer, that partially covers said cutouts; and
      a fourth layer, attached to said third layer.

7. The storage system of claim 6 where said third layer is affixed to said second layer along four pair-wise substantially orthogonal directions from a center region of said second layer, and said fourth layer is affixed to said third layer along four pair-wise substantially orthogonal directions from said center region of said second layer.

8. The storage system of claim 6 where said third layer and said fourth layer are discs.

9. The storage system of claim 8 where diameter of the third layer disc is larger than the diameter of said fourth layer disc.

10. A storage system including one or more pages, where each nape of the naves comprises:
    a first layer;
    a second layer, substantially superimposed on and attached to, said first layer, that includes N storage-device-holding elements of substantially identical in shape and size, N being an integer greater than one; and
    a holder arrangement, constructed to be an integral part of said second layer or attached to said second layer along more than one direction, that creates N descriptive-matter-media-holding spaces of a selected shape and size that are spatially situated to have a readily apparent 1 to 1 correspondence with said N storage-device-holding elements;
    wherein said second layer includes openings, and said page includes a third layer, interposed between said first layer and said second layer, where said third layer is attached to said second layer to form a plurality of said storage-device-holding spaces in spatial association with said openings.

11. The storage system of claim 10 wherein said third layer comprises a plurality of separate pieces that are attached to said second layer to form said plurality of said storage-device-holding spaces.

12. The storage system of claim 11 wherein said holder arrangement includes a plurality of openings in said second layer, one for each of said storage-device-holding spaces.

13. A storage system including one or more pages, where each page of the pages comprises:
    a first layer; a second layer, substantially superimposed on, and attached to, said first layer, that includes N storage-device-holding elements of substantially identical in shape and size, N being an integer greater than one; and
    a holder arrangement, constructed to be an integral part of said second layer or attached to said second layer alone more than one direction, that creates N descriptive-matter-media-holding spaces of a selected shape and size that are spatially situated to have a readily apparent 1 to 1 correspondence with said N storage-device-holding elements;
    wherein said holder arrangement means is a plurality of openings in said second layer, each of said openings being formed by cutting said second layer along a curve, or along at least two intersecting line segments, to form a flap, and folding the flap so as to position said flap between said first layer and said second layer.

14. A storage system comprising:
    one or more pages where each of the pages includes
    a) N storage-device-holding spaces adapted to hold a plurality of storage devices, where N is three or more; and
    b) a layer element that is affixed to said page, over said storage-device-holding spaces, to create N pockets, each of said pockets being in readily apparent spatial association with a different one of said storage-device-holding-holding spaces;
    wherein each of said pages is in the shape of a rectangle, or a square, and said layer element is circular, and said layer element is affixed to said page along four pair-wise substantially orthogonal directions from a center region of said page.

15. A storage system comprising: one or more pages where each of the pages includes
- a) N storage-device-holding spaces adapted to hold a plurality of storage devices, where N is three or more; and
- b) a layer element that is affixed to said page, over said storage-device-holding spaces, to create N pockets, each of said pockets being in readily apparent spatial association with a different one of said storage-device-holding-holding spaces;

where said layer element comprises four sub-elements that are attached to corners of said page.

16. A storage system having a plurality of pages, with each page of the one or more pages comprising:

N distinct storage-device-holding (SDH) spaces, each adapted to hold a storage device, where N is two of more; and N descriptive-media-holding (DMH) spaces, where each DMH space has a corresponding different one of the SDH spaces, and is arranged to be in physical association with its corresponding SDH spaces that, when a storage device is placed in a SDH space and a descriptive media is placed in the associated DMH space, results in the descriptive media at least partially covering, or being covered by, the placed storage device, where the DMH soaces are adapted to allow placing descriptive matter media into said spaces, and remove said descriptive matter media from said spaces, at will without having the placed descriptive matter media fall out of said spaces during normal handling of said each page;

where half of the N SDH spaces and their associated DMH spaces are on a first side of the page, and the other half are on a second side of the page.

* * * * *